US012607558B2

(12) United States Patent
Nguyen et al.

(10) Patent No.:  US 12,607,558 B2
(45) Date of Patent:    Apr. 21, 2026

(54) FAST SINGLE-MODE SPECTROSCOPY

(71) Applicant: IonQ, Inc., College Park, MD (US)

(72) Inventors: Jason Hieu Van Nguyen, Hyattsville, MD (US); Kevin Antony Landsman, Rockville, MD (US); Hermann Uys, Annapolis, MD (US); Shantanu Debnath, Lanham, MD (US); Peter Lukas Wilhelm Maunz, Albuquerque, NM (US)

(73) Assignee: IonQ, Inc., College Park, MD (US)

( * ) Notice: Subject to any disclaimer, the term of this patent is extended or adjusted under 35 U.S.C. 154(b) by 603 days.

(21) Appl. No.: 18/147,311

(22) Filed: Dec. 28, 2022

(65) Prior Publication Data

US 2023/0304927 A1     Sep. 28, 2023

Related U.S. Application Data

(60) Provisional application No. 63/294,725, filed on Dec. 29, 2021.

(51) Int. Cl.
  G01N 21/39      (2006.01)
  G06N 10/20      (2022.01)
      (Continued)

(52) U.S. Cl.
  CPC ............. G01N 21/39 (2013.01); G06N 10/20 (2022.01); G06N 10/40 (2022.01); G06N 10/60 (2022.01); *G01N 2021/393* (2013.01)

(58) Field of Classification Search
  CPC .. G01N 21/39; G01N 2021/393; G06N 10/20; G06N 10/40; G06N 10/60; G06N 10/70; G06N 10/00
  See application file for complete search history.

(56) References Cited

U.S. PATENT DOCUMENTS

| | | | | |
|---|---|---|---|---|
| 10,622,978 | B1* | 4/2020 | Debnath | .................. H03K 3/38 |
| 2020/0372391 | A1* | 11/2020 | Nam | ...................... H04B 10/70 |
| 2021/0304051 | A1* | 9/2021 | Brown | ................... G06N 10/40 |

OTHER PUBLICATIONS

Leung, P. H., & Brown, K. R. (2018). Entangling an arbitrary pair of qubits in a long Ion Crystal. Physical Review A, 98(3). https://doi.org/10.1103/physreva.98.032318 (Year: 2018).*

(Continued)

*Primary Examiner* — Wyatt A Stoffa
*Assistant Examiner* — Christopher J Gassen
(74) *Attorney, Agent, or Firm* — ARENTFOX SCHIFF LLP

(57)        ABSTRACT

Aspects of the present disclosure relate generally to systems and methods for use in the implementation and/or operation of quantum information processing (QIP) systems, and more particularly, to a fast single-mode spectroscopy technique that may be used in trapped-ion QIP systems. A method is described that includes performing a first measurement scan (full scan) across all motional modes of an ion chain in a trap followed by a second measurement scan on a single motional mode of the motional modes (single-mode scan). The second measurement scan determines a frequency shift associated with the single motional mode, which is applied to adjust the frequencies of all the motional modes. An implementation of two-qubit gates for quantum computations is based on the adjusted frequencies. A quantum computer or QIP system is also described that is configured to implement and perform the method described above.

21 Claims, 15 Drawing Sheets

1100 ⌐

Perform a first measurement scan across all motional modes
1110

Perform a second measurement scan on a single motional mode to determine a frequency shift associated with the single motional mode and with which to adjust the single motional mode
1120

Adjusting the frequencies associated with the remaining motional modes by applying the frequency shift
1130

Adjusting the implementation of two-qubit gates for quantum computations based on the adjusted frequencies
1140

(51) Int. Cl.
  G06N 10/40      (2022.01)
  G06N 10/60      (2022.01)

(56)        References Cited

OTHER PUBLICATIONS

Aleksandr Borisenko et al 2019 Laser Phys. 29 095201. DOI: 10.1088/1555-6611/ab2b9e (Year: 2019).*

Wineland DJ, Monroe C, Itano WM, Leibfried D, King BE, Meekhof DM. Experimental Issues in Coherent Quantum-State Manipulation of Trapped Atomic Ions. J Res Natl Inst Stand Technol. May 1998-Jun; 103(3):259-328. doi: 10.6028/jres. 103. 019. Epub Jun. 1, 1998. PMID: 28009379; PMCID: PMC4898965. (Year: 1998).*

Home, J. (2013). Quantum science and metrology with mixed-species ion chains. Adv. At. Mol. Phys. https://doi.org/10.48550/arXiv.1306.5950 (Year: 2013).*

J P Home et al 2011 New J. Phys. 13 073026 DOI: 10.1088/1367-2630/13/7/073026 (Year: 2011).*

* cited by examiner

400

Transverse (x-) normal mode frequency
(×2π MHz)

450 —

600

1020

1100 —

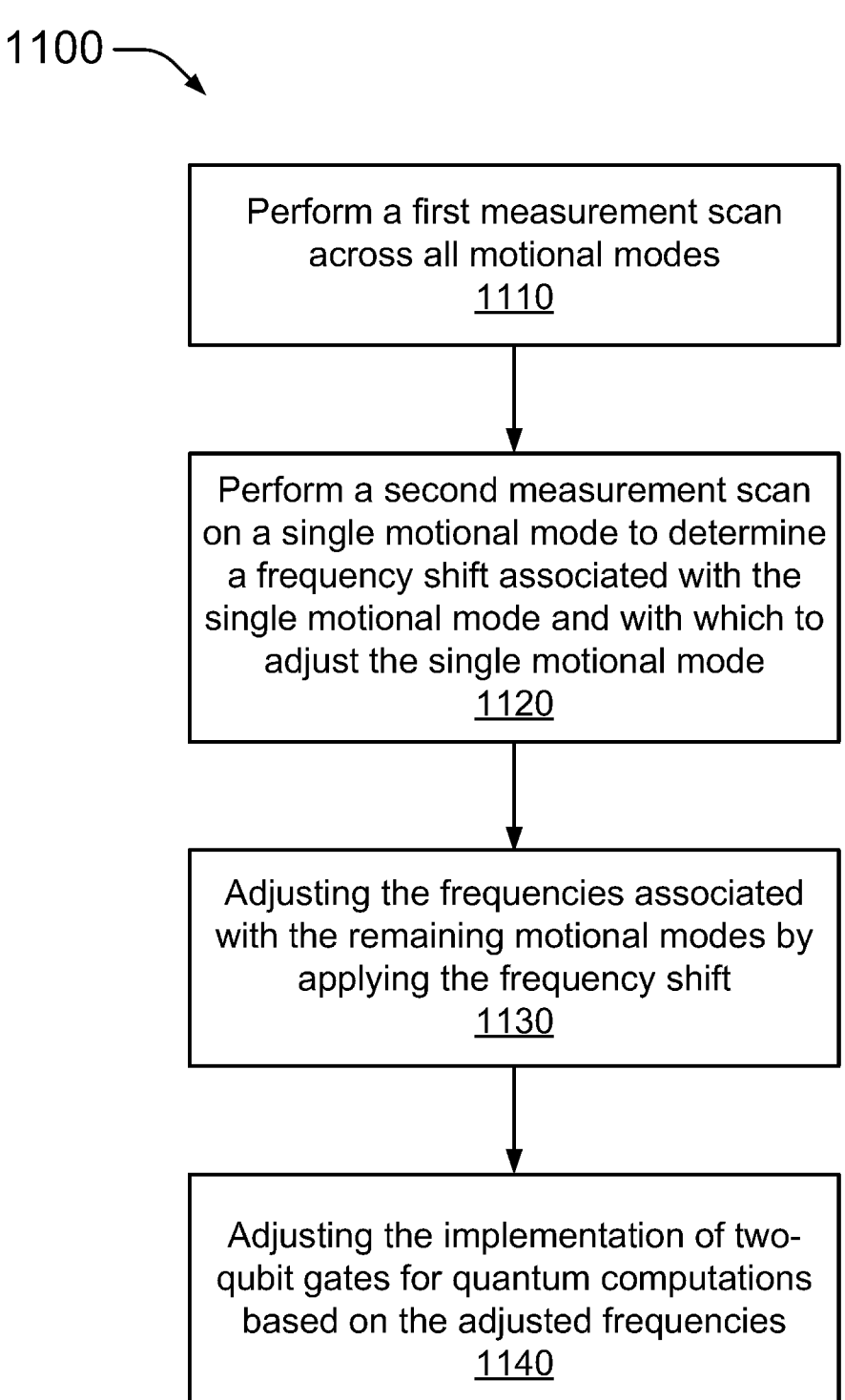

Perform a first measurement scan
across all motional modes
1110

Perform a second measurement scan
on a single motional mode to determine
a frequency shift associated with the
single motional mode and with which to
adjust the single motional mode
1120

Adjusting the frequencies associated
with the remaining motional modes by
applying the frequency shift
1130

Adjusting the implementation of two-
qubit gates for quantum computations
based on the adjusted frequencies
1140

FIG. 11

FAST SINGLE-MODE SPECTROSCOPY

PRIORITY

This application claims priority to and the benefit from U.S. Provisional Application No. 63/294,725, filed on Dec. 29, 2021, and titled "Fast Single-Mode Spectroscopy," the contents of which are incorporated herein by reference in their entirety.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of the implementation and operation of a fast single-mode spectroscopy technique that may be used in QIP systems.

A method is described for spectroscopy in trapped-ion quantum computers that includes performing a first measurement scan across all motional modes of an ion chain in a trap to determine frequencies associated with each of the motional modes, performing, subsequent to the first measurement scan, a second measurement scan on a single one of the motional modes to determine a frequency shift associated with the single motional mode and with which to adjust the single motional mode, adjusting the frequencies associated the remaining motional modes by applying the frequency shift associated with the single motional mode, and adjusting the implementation of two-qubit gates for quantum computations based on the adjusted frequencies for all the motional modes.

A quantum computer or QIP system is described that includes a trap configured to hold an ion chain having multiple ions, one or more controllers, and an algorithms component. The one or more controllers are configured to perform a first measurement scan across all motional modes of an ion chain in a trap to determine frequencies associated with each of the motional modes, perform, subsequent to the first measurement scan, a second measurement scan on a single one of the motional modes to determine a frequency shift associated with the single motional mode and with which to adjust the single motional mode, adjust the frequencies associated the remaining motional modes by applying the frequency shift associated with the single motional mode, and adjust the implementation of two-qubit gates for quantum computations by the algorithms component based on the adjusted frequencies for all the motional modes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 11 illustrates an example method for fast single-mode spectroscopy in accordance with aspects of this disclosure.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

Figure 1:
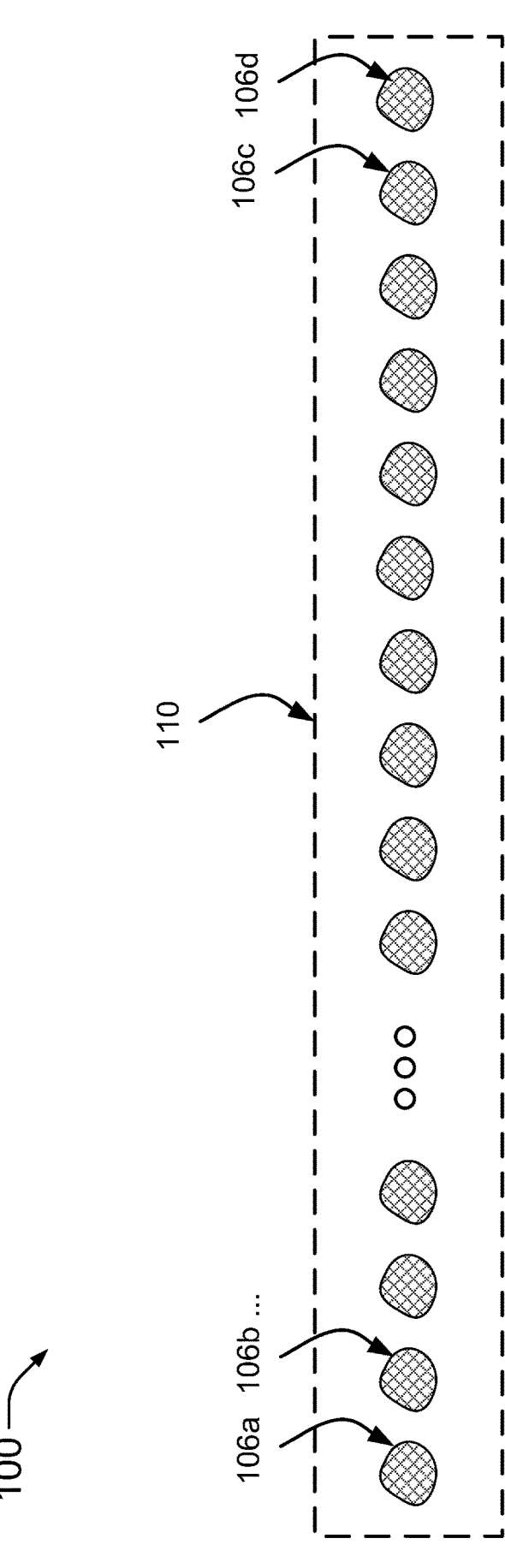
FIG. 1 illustrates a view of atomic ions a linear crystal or chain in accordance with aspects of this disclosure.

Two-qubit gates are used in quantum computing to perform a wide range of operations. When based on trapped ions, the two-qubit gate uses the motional modes of a trapped ion chain (see e.g., FIG. 1 shown below), where implementing and performing the two-qubit gate is achieved by coupling the internal state to the motional mode. These different motional modes have a well-defined relative ion movement and occur at a particular frequency for each mode. One requirement for optimal gate fidelity is that the frequencies and relative ion movements are well-known since the gate solutions use these parameters to calculate optimal solutions. Values of the frequencies can drift over time and repeated measurements are needed to address such drifts. These measurements, however, may take a long time to complete. Accordingly, it is desirable to develop new techniques that allow for faster completions.

Solutions to the issues described above are explained in more detail in connection with FIGS. 1-11, with FIGS. 1-3 providing a background of QIP systems or quantum computers, and more specifically, of atomic-based QIP systems or quantum computers.

Figure 2:
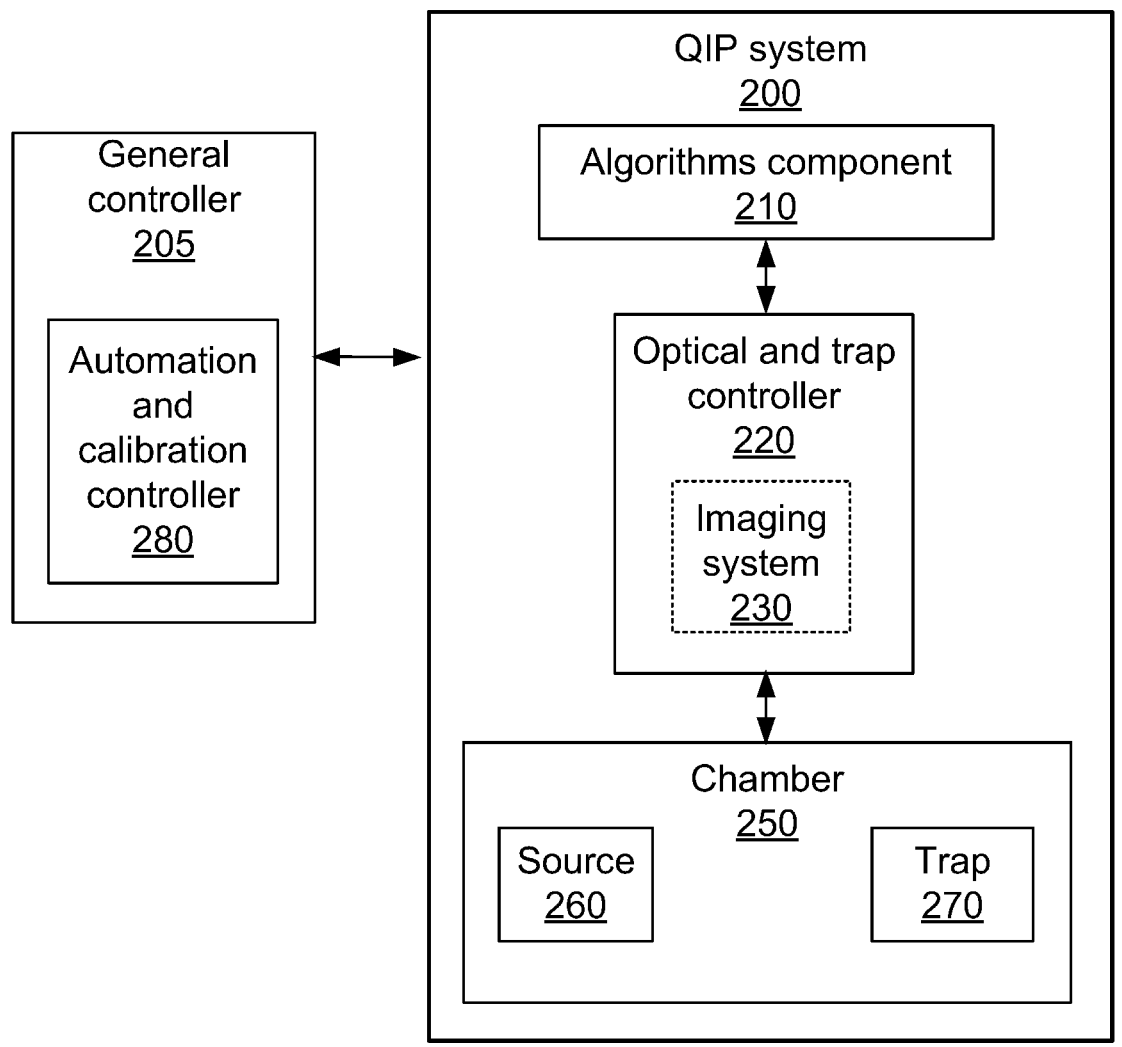
FIG. 2 illustrates an example of a quantum information processing (QIP) system in accordance with aspects of this disclosure.

FIG. 1 illustrates a diagram 100 with multiple atomic ions or ions 106 (e.g., ions 106*a*, 106*b*, . . . , 106*c*, and 106*d*) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be ytterbium ions (e.g., $^{171}\text{Yb}^+$ ions), for example. The ions are illuminated with laser (optical) radiation tuned to a resonance in $^{171}\text{Yb}^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to ytterbium ions, barium ions neutral atoms, Rydberg atoms, or other types of atomic-based qubit technologies may also be used. Moreover, ions of the same species, ions of different species, and/or different isotopes of ions may be used. The trap may be a linear radio frequency (RF) Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the general controller 205, the automation and calibration controller 280, and/or the optical and trap controller 220, for example.

Figure 3:
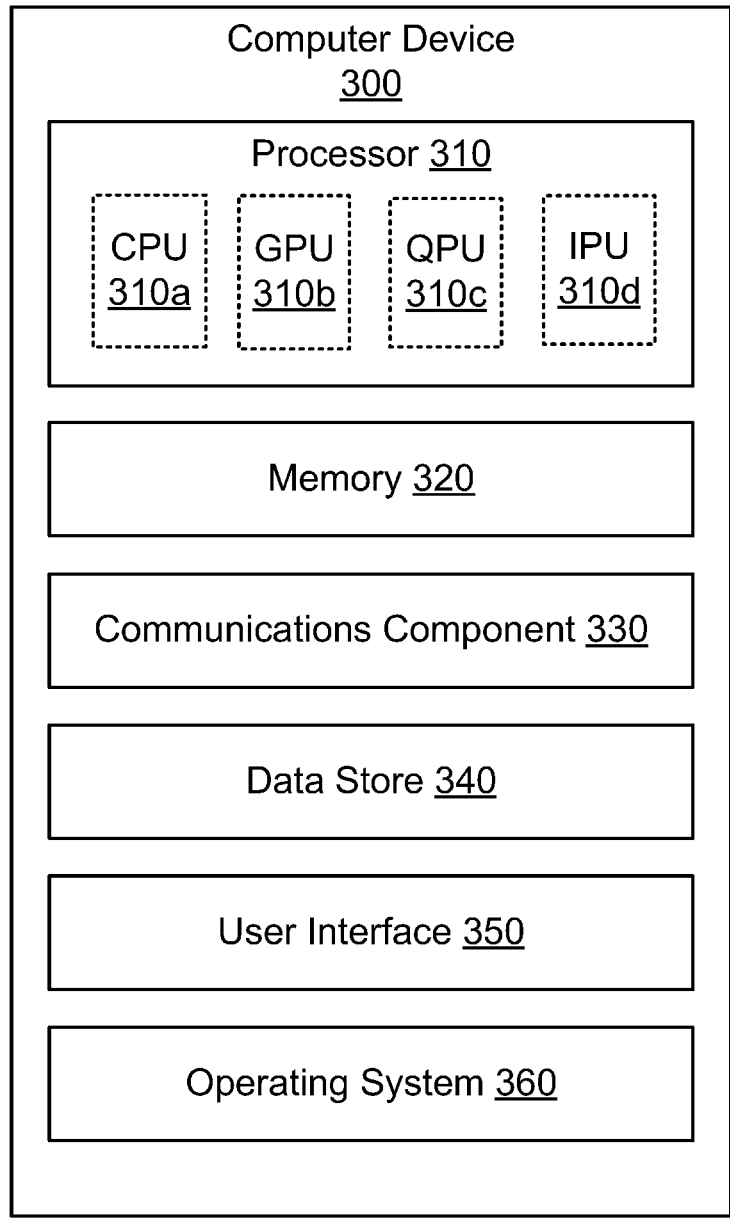
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, the implementation and operation of a fast single-mode spectroscopy technique is described in more detail below with respect to FIGS. 4A-11.

Figure 4A:
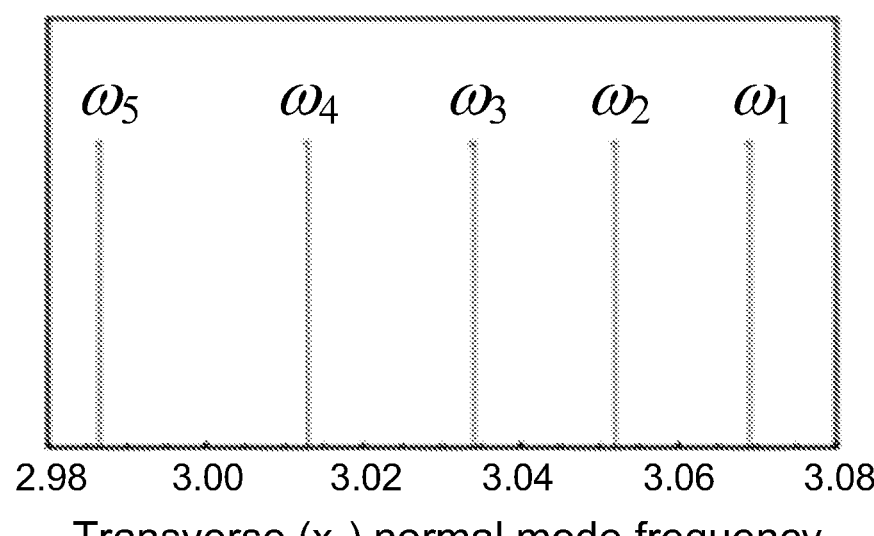
FIG. 4A illustrates an example of five motional frequencies in accordance with aspects of this disclosure.

FIG. 4A shows a diagram 400 that illustrates a chain of five (5) ions for which there are five possible mode frequencies and five possible motional modes. As mentioned above, these transverse motional modes have a well-defined relative ion movement and occur at a particular frequency for each mode. The number of mode frequencies is the same as the number of ions in the chain (e.g., number of ions 106 in chain 110), so this example is provided for illustration purposes as more or fewer ions may be part of the chain. In this example, the five motional frequencies correspond to the five relevant frequencies that drift over time and need to be measured.

Figure 4B:
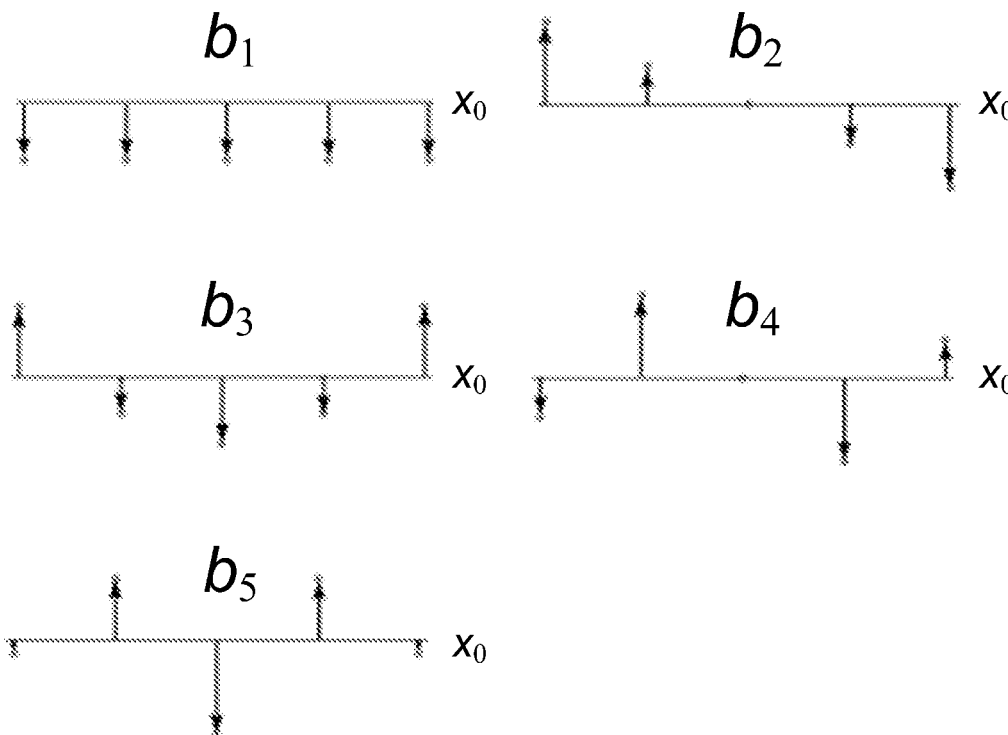
FIG. 4B illustrates an example of the different modes of motion in accordance with aspects of this disclosure.
Figure 5:
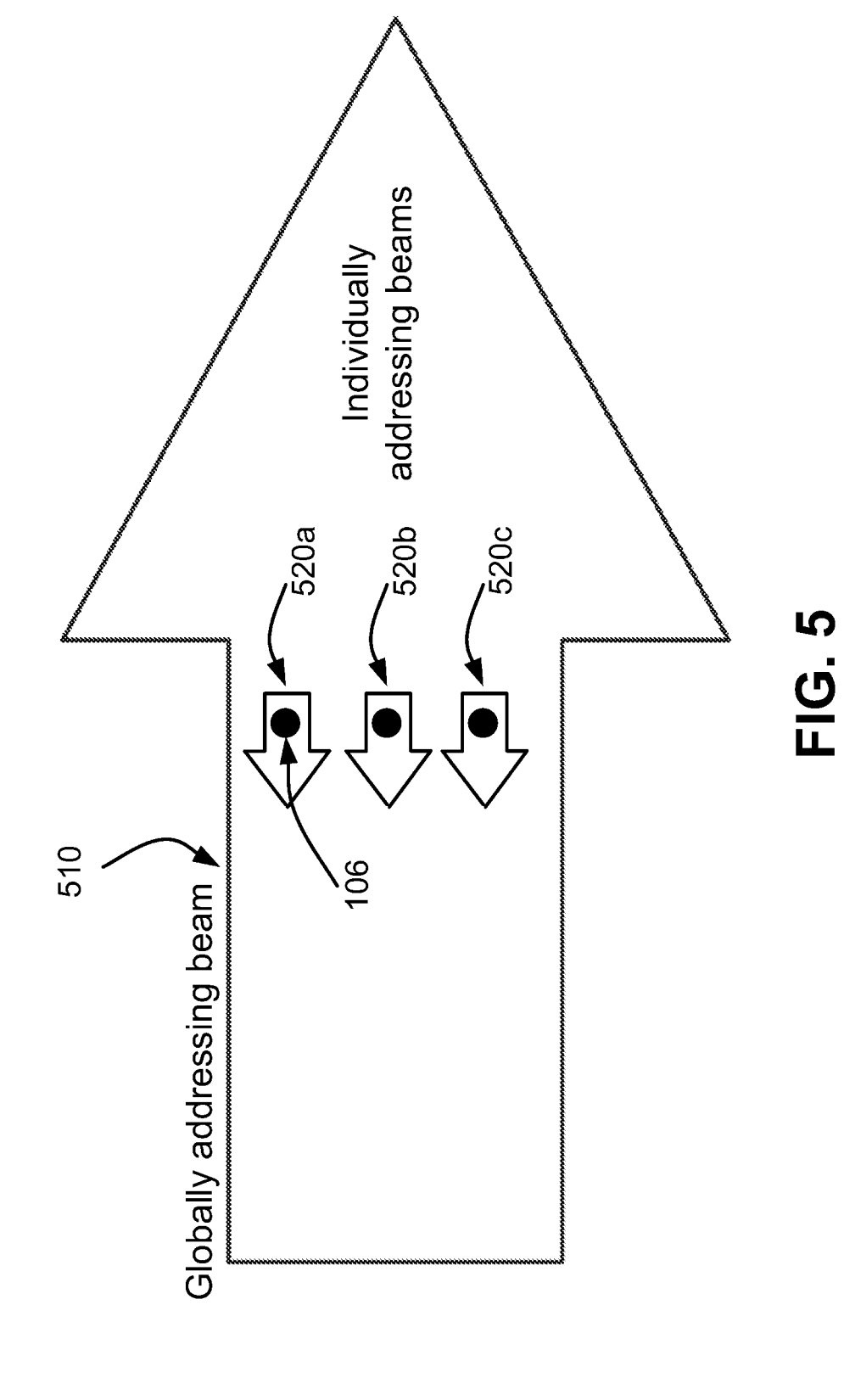
FIG. 5 illustrates an example of changing the frequency of individual beams at the same time in accordance with aspects of this disclosure.

FIG. 4B shows a diagram 400 that illustrates an example of the different modes of motion with the arrows specifying the direction of motion of each of the ions in the 5-ion chain described above in connection with the diagram 400 in FIG. 4A. Although the direction of the motion of a particular ion is not that relevant, the amplitude of the arrow specifies the participation of the ion, or how easy it is to drive the transition using that particular ion. An ion with low participation for a given mode requires more power to measure it. Thus, to implement or perform high fidelity two-qubit gates, it is important to track and know the frequencies of these modes and have information about their participation or how easy it is to track each ion when looking at the frequency. In other words, certain ions in the chain are more relevant for certain modes than other ions in the chain. The examples labeled $b_1, \ldots, b_5$ show both the direction and the amplitude participation of different ions in the chain for the five motional modes supported by the chain.

To measure the motional frequencies and the participation, one approach is to apply a frequency difference between a global beam (which addresses all the ions in the chain) and an array of individual beams, each of which is capable of individually addressing each ion. In an example, a QIP system (see e.g., FIG. 2) can generate an optical beam that is used as a global beam and can also generate individual optical beams for each of the ions in the chain (see e.g., FIG. 1). The QIP system may be configured to control (e.g., individually or separately) the amplitude, frequency, phase, and/or polarization of any one of the optical beams it generates and may do so by using electro-optic modulators (EOMs), acousto-optic modulators (AOMs), electro-optic deflectors (EODs), acousto-optic deflectors (AODs), or a combination thereof. In some implementations, a different set of individual optical beams may be used instead of a global beam. The frequency of the individual beams are changed in unison or concurrently, and the frequency as well as participation of each is measured, as shown a diagram 500 in FIG. 5. In this diagram, three (3) ions 106 are shown for illustrative purposes, where the globally addressing beam 510 is applied to all ions 106 and individually addressing beams 520a, 520b, and 520c are applied to their respective ions 106. The use of the same type of arrow for all individually addressing beams is to represent that concurrent frequencies are applied to the ions.

The approach described above allows for the spectrum to be measured. This type of spectrum measurement may be referred to as spectroscopy. An example of spectrum measurement for a 15-ion chain is shown in a diagram 600 in FIG. 6. In this case, 15 different frequencies (in MHz) are measured (frequencies 0-14), one for each ion in the chain. Typically, this process takes many minutes, and a variety of different factors (e.g., stray field drifts, changes in the radio frequency (RF) power) may cause these frequencies to drift over the course of the day, and so this measurement is often repeated. Additionally, drifts may be observed over the course of the measurement itself.

In this disclosure a change is presented in the way in which spectroscopy is done. This approach allows for the measurement of a single mode to be performed much more quickly, as fast as in a few seconds or less. In principle, this would allow to measure all the modes of the chain very quickly. In the example in FIG. 6, the fifteen modes could be measured in fifteen to thirty seconds, for example. However, typically re-measurement of a single mode is sufficient as it is generally observed that a common drift occurs across all the modes, that is, all of the modes tend to drift by a frequency amount that is the same for each mode, and in the same direction. That is, re-measurement of a single mode can be used to determine the drift in frequency that occurs in all of the modes.

Figure 7:
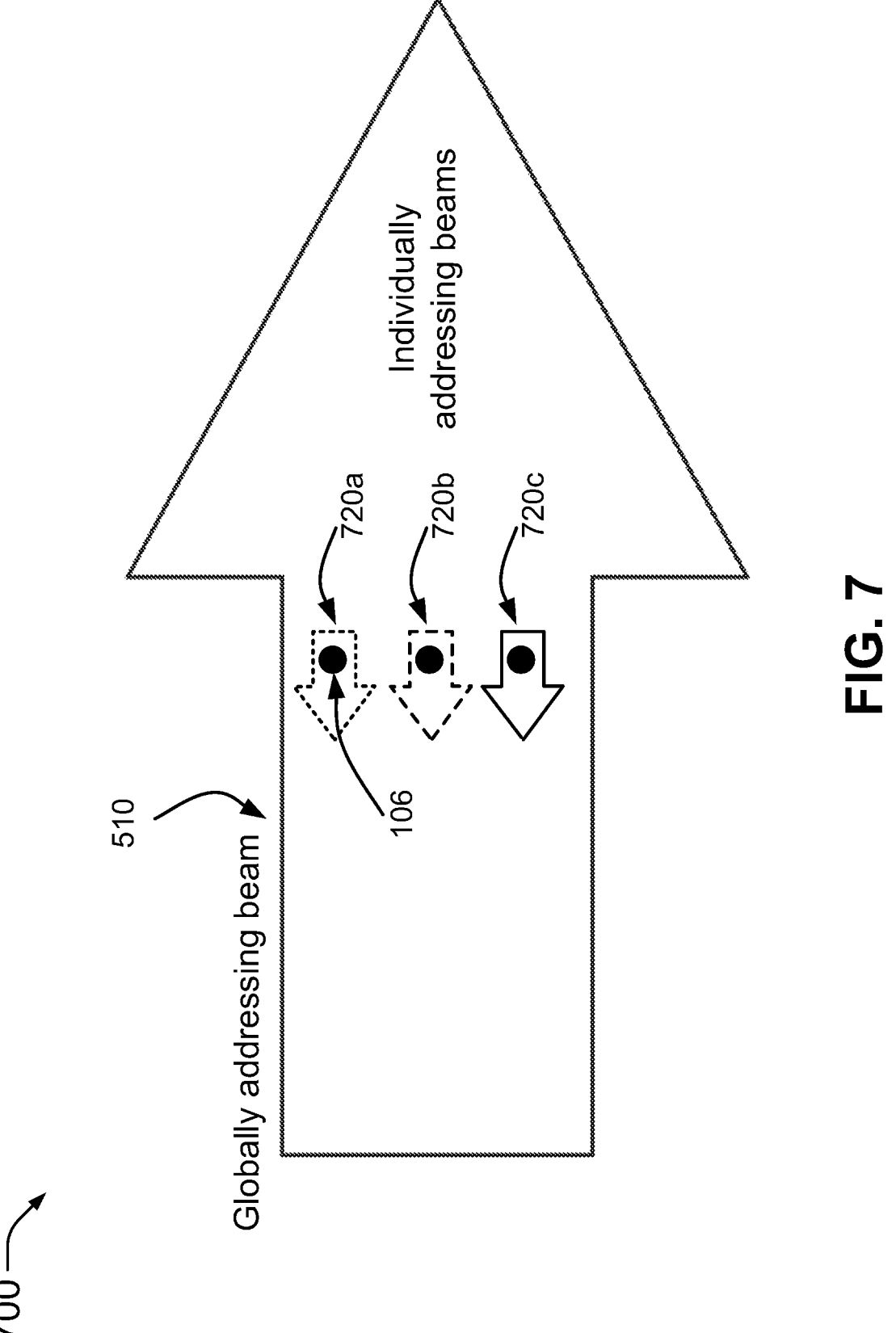
FIG. 7 illustrates an example in which different frequencies are applied to different individual beams in accordance with aspects of this disclosure.

A feature that makes this approach possible is to apply different frequencies on each of the individual beams, as indicated in a diagram 700 in FIG. 7 by having different line types for the different individual arrows to represent different frequencies being used with individually addressing beams 720a, 720b, and 720c on the three (3) ions in the example. Note that globally addressing beam 510 has not changed from the example shown in the diagram 500 in FIG. 5.

Figure 8:
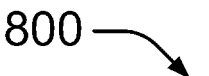
FIG. 8 illustrates an example of a plot that shows seven data points to map the frequency to a spatial location in accordance with aspects of this disclosure.
Figure 8:
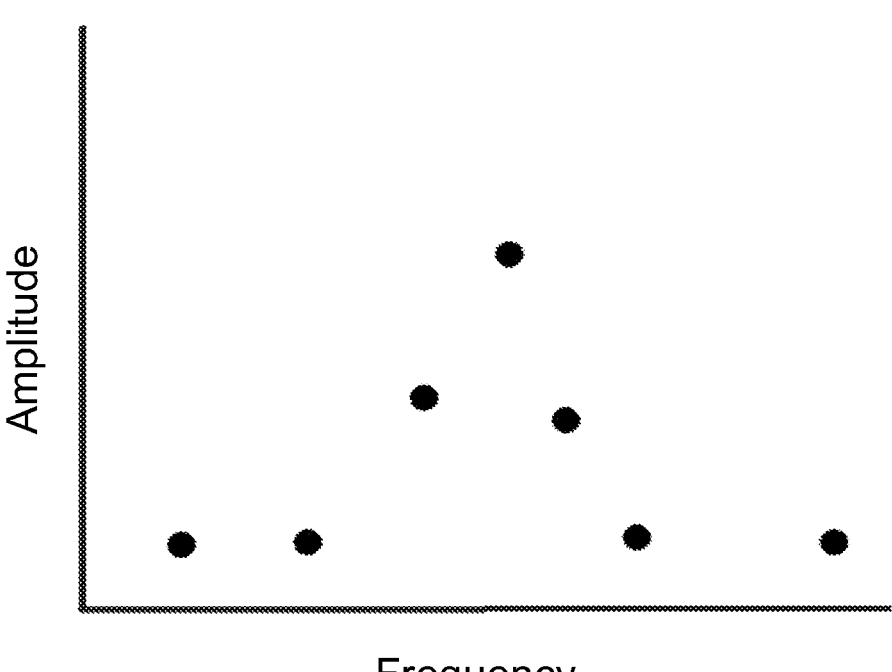

This approach takes advantage of the fact that there are multiple ions for mapping frequencies to spatial locations. For example, each ion in the chain represents a different spatial location and each ion in the chain is addressed with an individual beam having a frequency that is different for that ion than each of the frequencies used for the other ions in the chain. Looking at what is referred to as a single mode frequency measurement, a diagram 800 in FIG. 8 illustrates a plot for measuring data points to map the frequency. In this example, seven data points are used for illustration purposes, but more or fewer data points may be used.

In a typical method of performing this measurement, the individual beam frequency would be changed in unison (e.g., at the same time), and at each frequency a data point would be taken. When the frequency is wrong, that is, the frequency applied is not the correct frequency, the outcome of the measurement is a low signal or no signal at all. When the frequency applied is the correct frequency, the outcome of the measurement is a signal in which the amplitude is larger than that of other measurements. In the example in FIG. 8 all the data points are of the same shading or color (e.g., black), indicating that each individual beam is at the same frequency, and they are changed together to obtain each data point. Thus, in this example, the total measurement requires seven sequential measurements, one for each data point. The data is subsequently fit in order to determine the frequency at the peak of the data, which is then assigned as the frequency of the particular mode.

Figure 9:
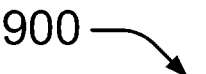
FIG. 9 illustrates an example of a plot that shows seven data points to map the frequency to a spatial location by having a different frequency applied to each ion in accordance with aspects of this disclosure.
Figure 9:
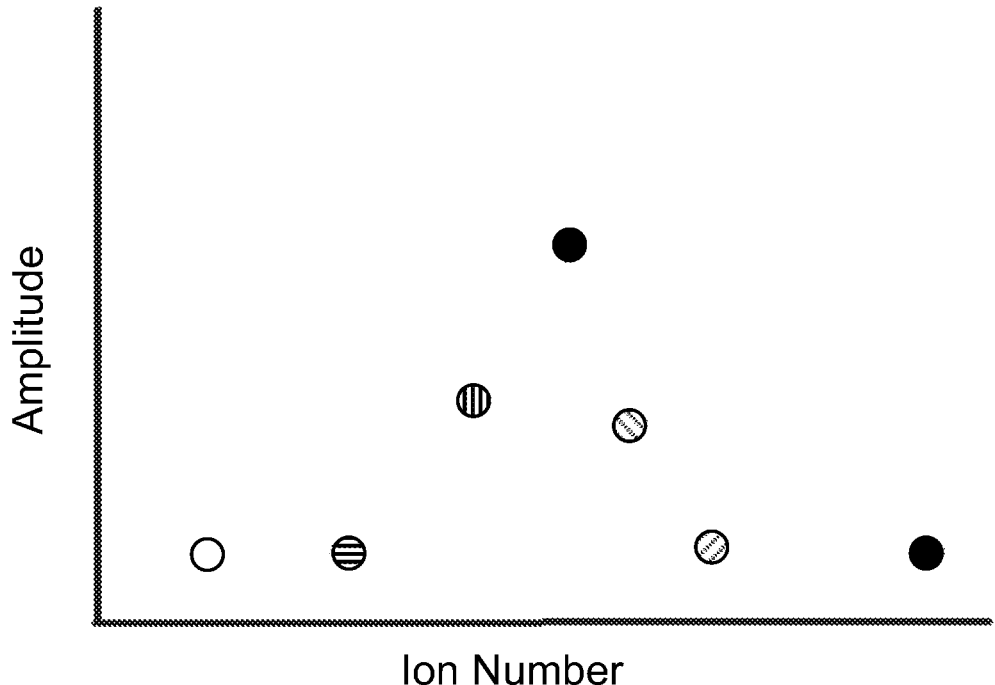
Figure 10A:
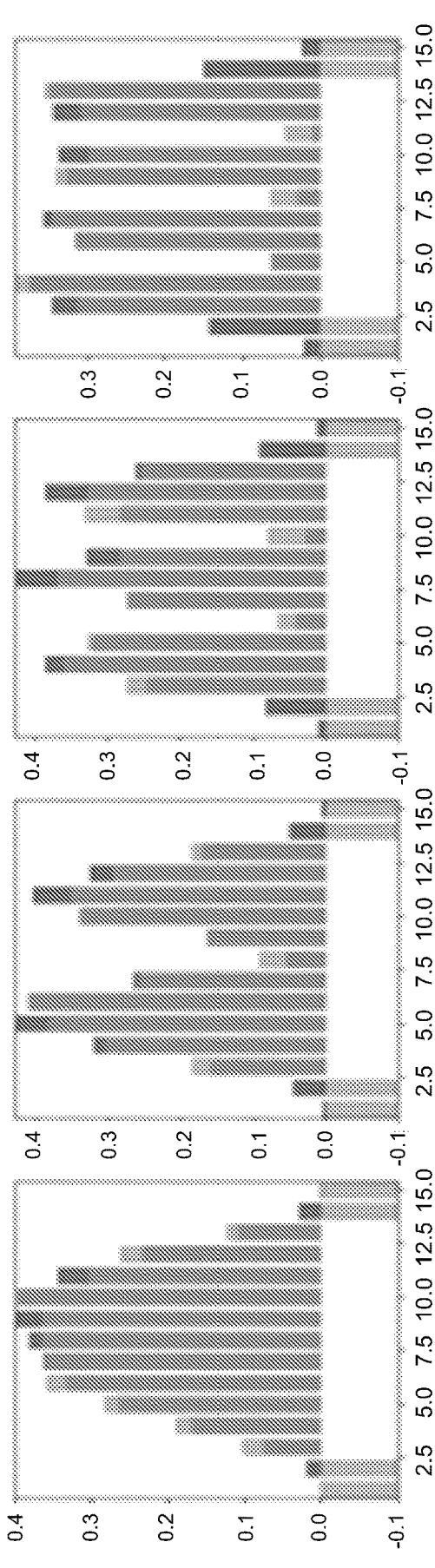
FIGS. 10A-10D illustrate an example of participation measurements for a 15-ion chain in accordance with aspects of this disclosure.
Figure 10B:
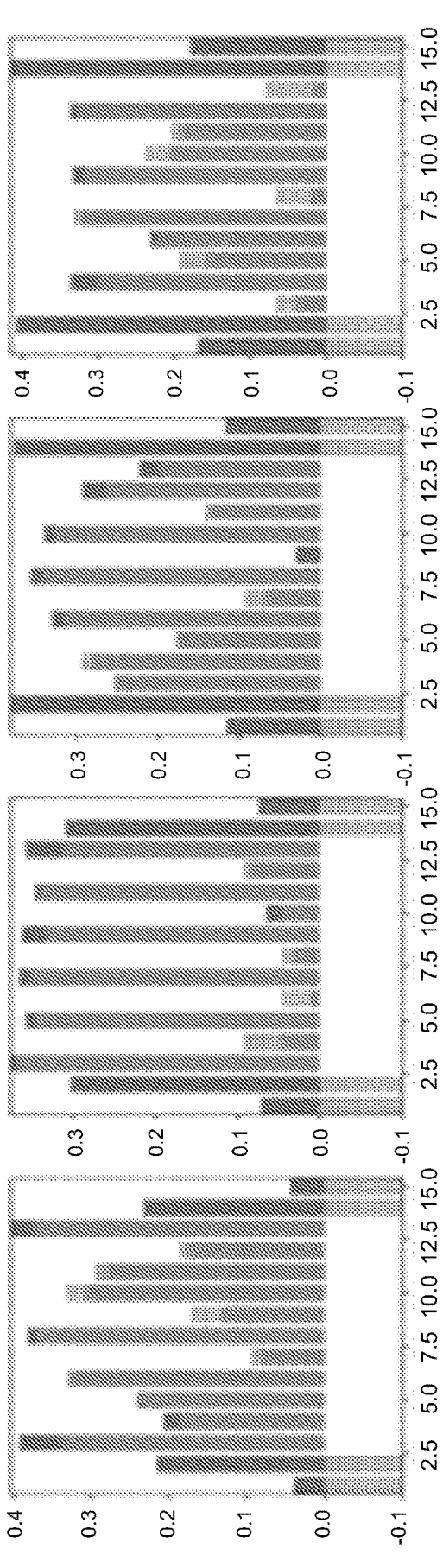
Figure 10C:
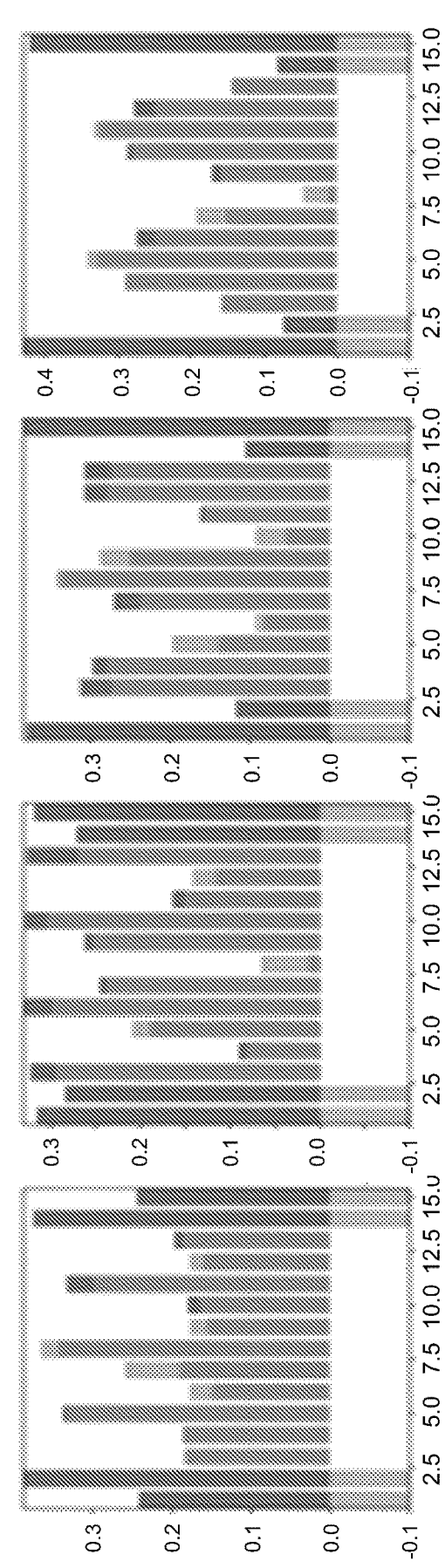
Figure 10D:
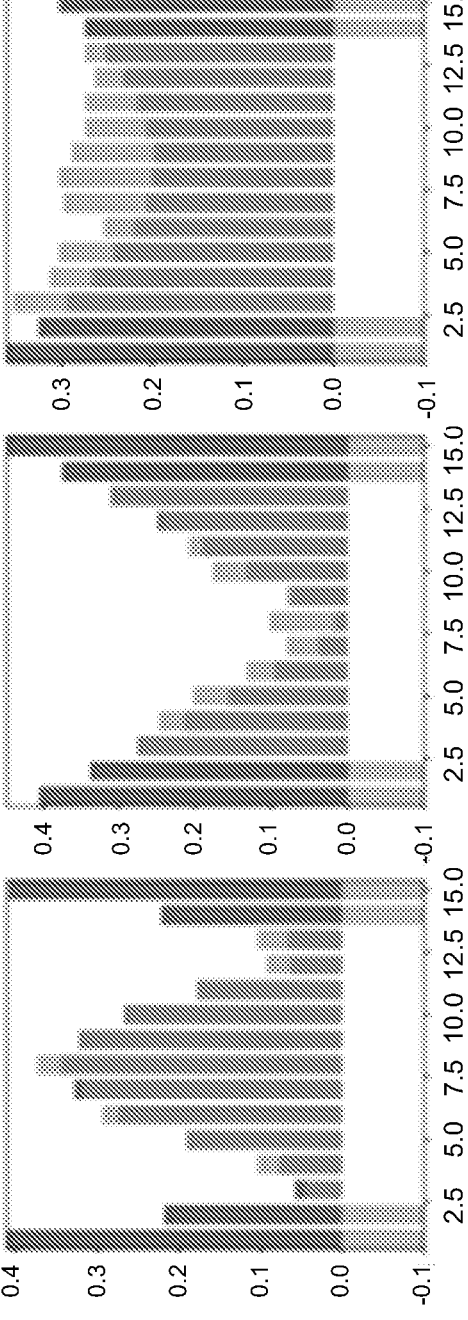

In the method being proposed in this disclosure, instead of using the same frequency for all ions different frequencies are applied to the different ions, which allows the measurement of the entire spectrum with a single measurement, as shown in a diagram 900 in FIG. 9. In the example in FIG. 9 all the data points have a different shading, indicating that each individual beam is at a different frequency. Here, the data can also be fit to determine the frequency at the peak of the data, which is assigned as the frequency of the particular mode that is measured.

In this case, each ion is used to make a measurement at each of the different frequencies shown previously. Since the system is configured to allow for addressing and measuring each ion individually, it is now possible to take all seven of the previous measurements with a single measurement, resulting in a significant speedup of how this measurement was performed previously. The factor of seven is just for illustration purposes. It is possible then to reduce spectroscopy measurements from minutes to as fast as a second.

FIGS. 10A-10D show diagrams 1000, 1010, 1020, and 1030, respectively, that illustrate an example of participation measurements in a 15-ion chain. The fast single mode technique described herein can be separately used to probe the participation, however this is only used as a diagnostic tool since the participations do not drift on fast timescales like the frequencies do. Based on the technique described above, the information collected from this technique is used to properly tune the overall system to implement and perform high fidelity two-qubit gates. The stability of the frequencies and the participations (FIGS. 4A and 4B) depend on stray fields and how well stabilized is the RF trap. Throughout the course of a day, or throughout the course of a measurement, the frequencies may drift by small amounts, and it is important to track these drifts to make the appropriate corrections.

As described above in connection with FIG. 5, the standard approach has been to scan a laser across the different frequencies and at each frequency apply a laser pulse for a fixed period and then measure at what state the ion is in. When the ion is resonant, there is a peak in detection counts (e.g., by the imaging system 230 in FIG. 2). This is how to scan the individual laser frequencies and measure the frequencies. The process involves calculating or determining where these frequencies ought to be and then searching for them.

The amount the frequencies drift by once they are found is small. Change in the stray field environment, due to charging from light or other causes, will result in shifts in the motional frequencies. This may occur when a new chain of ions is loaded, however, this also occurs throughout normal operation.

In the technique described in connection with FIG. 7 there is still a need to do what is described above first, but once it is known where the frequencies are, it is possible to then do the single shot faster measurement. Additional details to this technique are provided below and expand on the descriptions of FIGS. 7 and 9.

Typically, a global addressing beam (see e.g., FIGS. 5 and 7) at 355 nm light is shined at the same frequency across all of the ions in a chain and there are individually addressing beams that go in a different direction (e.g., opposite direction). All the individually addressing beams are at the same frequency but each addresses a different ion. It is possible to turn ON and OFF each of these individually addressing beams.

Although not shown in FIG. 2 or 3, the QIP system 200 and the computer system 300 may include components to control the operation of the individually addressing beams (e.g., EOMs, AOMs, EODs, AODs). For illustration purposes, the example described below is based on the use of AOMs, but similar approaches may be possible by using any of EOMs, EODs, or AODs.

When a beam is passed through an AOM, it produces a frequency shift and a frequency difference from the original frequency of the beam. It starts with an original laser beam frequency and, after it leaves the AOM, is that original frequency plus a small amount (~199 MHz or 200 MHz). By using a multichannel AOM, it is possible to have a channel dedicated to each ion so that the laser beam to each ion is individually controlled and each ion is then individually addressed. In an example where the AOM is a 32-channel AOM and the ion chain has 11 ions, there are enough channels in the AOM to individually address each of the ions with a separate laser beam.

Figure 6:
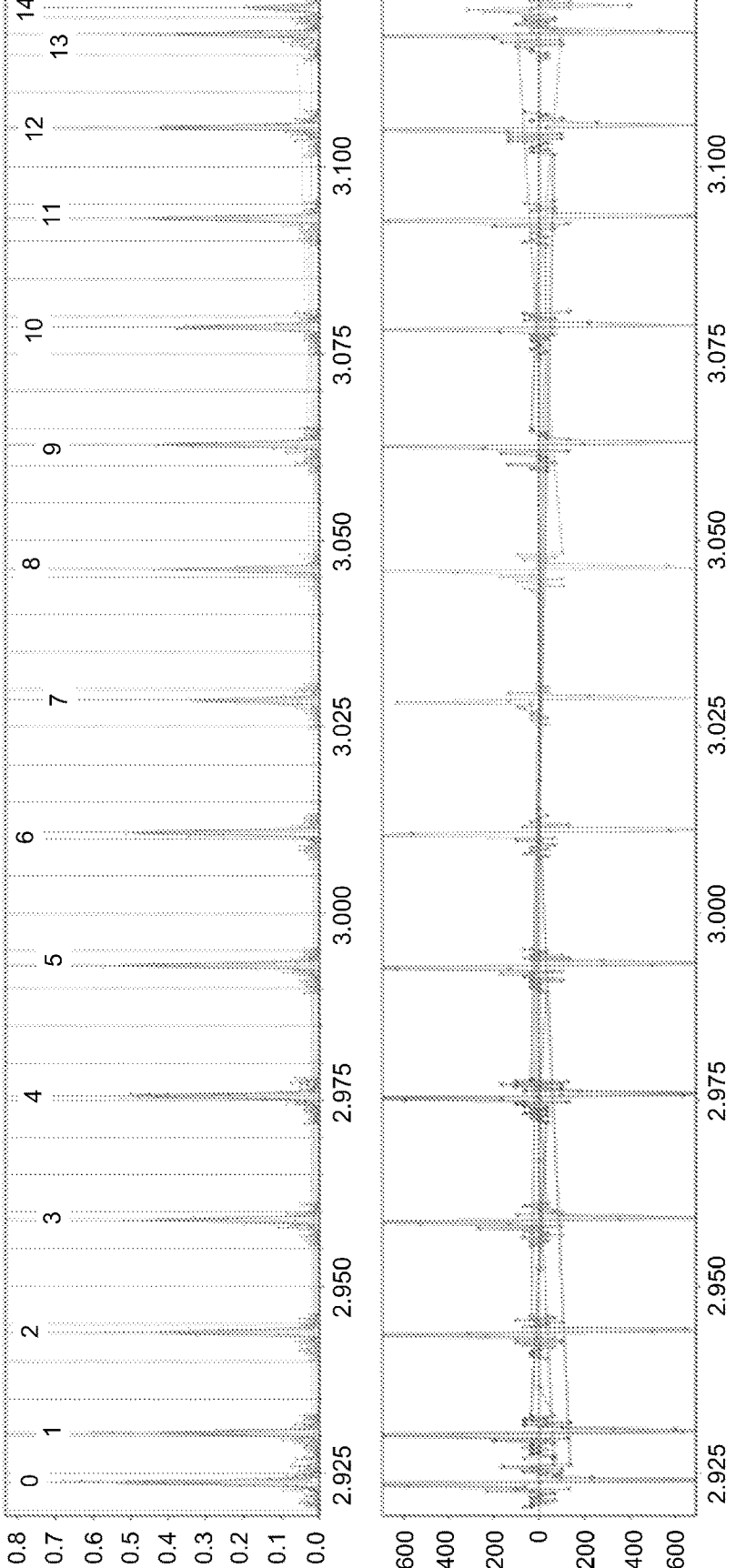
FIG. 6 illustrates an example of measured frequencies in a 15-ion chain in accordance with aspects of this disclosure.

As shown in FIG. 6, normally all the individual beams are scanned together at the same time. In this example, the range is from approximately 2.925 MHz to 3.100+ MHz to cover all 15 frequencies for a 15-ion chain. By scanning through the frequencies, for this 15-ion chain there are 15 modes that come up. The scan, as mentioned above, is typically very slow and there is also the likelihood of frequency shifts over the course of the measurement.

One of the things that is of relevance is the relative frequency between the different modes. When starting from one end of the spectrum and scanning through the other end, it is possible to get drifts between the relative frequencies (relative drifts). These drifts occur in the time scale it takes to make the time measurement from one end of the spectrum to the other end of the spectrum. This may be because the spacing may be slight incorrect in some instances and/or because it takes a long time to complete the scan. For example, for a 15-ion chain the scan time can be between 2 minutes and 4 minutes.

The new technique being proposed herein can significantly reduce the scan time. In some cases, the new scan time can be a matter of seconds (or less) instead of minutes. It is a big improvement, but the improvements may come with some tradeoffs. What is done differently in this approach is that rather than scanning through all the frequencies slowly it is possible to use the fact that there is a N-ion chain (N≥2) and can apply different frequencies to the different ions in the chain.

So now, rather than scanning through the modes individually the frequencies are changed such that the frequency at each ion has a slight change around where the peak is, that way it is possible to take all the relevant points simultane-ously, at least up to 15 of them in this example.

This is shown in connection to FIGS. 8 and 9. In FIG. 8, during a normal scan, the frequency is being scanned and an individual peak is traced out. In FIG. 9, instead of using the whole chain at the same frequency as in FIG. 8, each ion in the chain is used with a different frequency. The curve in FIG. 9 can be taken much faster because all the points are done at the same time. The idea behind the technique in this disclosure is to do all of the points simultaneously and individually measure how much light is detected from each ion and use these results to reconstruct or determine what the spectrum looks like.

The tradeoff is that only one mode is being measured at a time and a full spectrum is not being done. However, experimental results show that when one of the frequencies drifts, they all appear to be drifting together in a common mode fashion. For example, if one mode/frequency has shifted by about 100 Hz, all other modes/frequencies have also shifted by 100 Hz. By measuring one mode the same drift can be applied to all others and maintain the correct frequency.

As described above, a typical or normal (full) scan measurement is first performed across all modes, and then a fast, single-mode scan can be performed subsequently to detect drifts on a single mode and apply the drifts to all the other modes. The normal scan measurement may be per-formed when loading a new ion chain. Over time there may be a drift of a few kilohertz (kHz), maybe 4-6 kHz, which may depend on how long it takes for the loading process to complete.

One approach that uses the technique described herein in an ion chain loading situation may be to perform a full scan measurement, follow it by performing a single shot (i.e., single mode) measurement to see if it has drifted by the 4-6 kHz, and if it has, then perform a narrower band version of the full scan measurement (about the peaks) than would have been done before. This technique can also be used to cut down the scan time by figuring out the starting point for subsequent full scan measurements to make such measure-ments shorter in duration.

There may be several use cases for the fast single-mode spectroscopy technique described herein. One is, as described above, a way to locate a starting or initial point for a scan in connection with loading an ion chain. QIP systems based on trapped ions can have the mode frequencies drift as a function of time after loading a new chain of ions (e.g., forming the ion chain 110 in FIG. 1). One approach is to use a single shot or single mode scan/measurement continuously to track the frequency shifts before doing any sort of computations on the system. The continuous tracking is used to wait until the frequency drifting has slowed down enough that the system is considered settled. With the system settled, it is now available to perform quantum computations or operations in a more controlled manner. Rather than using a fixed amount of time to assume that once that amount of time has passed the system should be settled, it is possible to use fast single-mode spectroscopy to dynamically deter-mine when the system has settled and that it is ready to move on to computations or operations without wasting unneces-sary time.

Another approach is to use fast single-mode spectroscopy during tuning itself. One of the things that are typically done during operations of QIP systems is to have point checks. At these point checks the fidelity or quality of two-qubit gates is checked to see whether it is good enough to proceed with the computation already taking place. A point check can send the overall process to what is called a check spectral branch that is used to tell us whether the mode frequencies have shifted. Normally what would be done is to measure the mode spectrum. Once the values are obtained and processed a new point check is performed to ensure the two-qubit gate quality is good to proceed. That could take several minutes and slow down the computation operation significantly. With the technique described herein instead of using a full spectrum scan or measurement if the point check tells that the spectra needs to be updated it is now possible to use a single shot or single mode measurement and update the frequencies simultaneously. This again would reduce the overall measurement time considerably.

The technique described herein for fast single-mode spec-troscopy can also be used to measure the participation in addition to frequency drifts. Referring back to FIGS. 10A-10D, there are shown participation measurements performed as part of fast single-mode spectroscopy on a 15-ion chain. FIGS. 10A-10D shows 15 measurements, one for each mode, where each measurement also shows the participation of the 15 ions in the chain. The 15 bars in each measurement correspond to the 15 ions in the chain, with two end caps at each end that are not computation qubits. The end caps are there to provide the correct field and spacing between qubits. In this example, although there are 15 total qubits/ions, only 11 qubits are used for computations and 4 are end caps. The participation of each qubit is represented by the height of the corresponding bar.

Typically, the participations shown in FIGS. 10A-10D may be measured by using a full scan measurement as discussed above. In such approach, the frequency is fixed, and the scan is performed simultaneously through all the ions. The single shot or single mode spectroscopy technique described herein can be used to measure the participation individually as well. One approach may be to apply the same frequency to all ions and look at each photomultiplier (PMT) separately and from the fluorescence or how high or how big the signal is measure how much that ion participates in that given mode. Where this is useful is that it can be fed back into what the two-qubit gate solution needs to look like to perform at the highest quality gate that can be produced.

Moreover, because each mode frequency can be measured quickly, it is possible to measure the mode frequency and sit on top, resonantly meaning that it is at a frequency deter-mining of phase from that particular mode and turn on all the other beams simultaneously and sort of trace out each separate curve, as shown in FIGS. 10A-10D.

The information from the different mode profiles gives a measure of whether the profiles change and that may provide an indication that the gate solutions need to be updated.

There are other benefits of measuring the participation mode profiles. When making the single shot measurements, it is possible to determine if sitting on top of a particular mode. There may be instances in which the frequency has drifted enough far away from the mode that it has moved to the next mode over. This may result in a mode measurement where the mode has been mischaracterized because the frequency has drifted at least one mode over. It is then possible to perform a fast single shot measurement right after to determine from participation profiles if the mode frequency measured corresponds to the correct mode. If it does not correspond to the correct mode, then the measure-ments needs to be moved one mode over to be made on the correct mode.

As mentioned above, because the frequency drifts for modes can be consistent, it is possible to determine if other modes are incorrect modes. There may be cases, however, where the modes do not drift commonly with one another. From theory and experiments it is possible to figure out which modes tend to drift commonly in a system. There is what is referred to as common mode drift and what is referred to as a breathing drift that doesn't drift the same amount together. It is possible to measure a mode that drifts commonly and a mode that typically breathes. If the frequency difference between the two modes is measured relative to a common value and if the common mode drifts by a first amount (e.g., 3 kHz) and the breathing mode drifts by a second amount (e.g., 2 kHz) then applying a common mode shift to all modes would be inappropriate and may need to do a full measurement at that point. In this example, instead of one shot it is possible to use two shots to obtain the information that is needed and then do a larger scan to correct for the breathing drifts that may be present.

FIG. 11 shows a method 1100 that illustrates an example for fast single-mode spectroscopy. At 1110, the method 1100 includes performing a first measurement scan across all motional modes of an ion chain in a trap to determine frequencies associated with each of the motional modes.

At 1120, the method 1100 includes performing, subsequent to the first measurement scan, a second measurement scan on a single one of the motional modes to determine a frequency shift associated with the single motional mode and with which to adjust the single motional mode.

At 1130, the method 1100 includes adjusting the frequencies associated the remaining motional modes by applying the frequency shift associated with the single motional mode.

At 1140, the method 1100 includes adjusting the implementation of two-qubit gates for quantum computations based on the adjusted frequencies for all the motional modes.

In an aspect of the method 1100, performing the first measurement scan is in response to a loading of the ion chain in the trap.

In an aspect of the method 1100, in response to the frequency shift associated with the single motional mode exceeding a specified range, the method 1100 further includes performing a third measurement scan across all motional modes using a narrower scanning frequency band about the adjusted frequencies for all motional modes.

In an aspect of the method 1100, the first measurement scan includes multiple measurements each of which includes applying a global addressing optical beam to all the ions in the ion chain and individually addressing optical beams to each of the ions in the ion chain at the same frequency. The method 1100 further includes controlling the frequency of the individually addressing optical beams with an optical modulator or an optical deflector.

In an aspect of the method 1100, the second measurement scan includes a single measurement that includes applying a global addressing optical beam to all the ions in the ion chain and individually addressing optical beams to each of the ions in the ion chain at different frequencies. The method 1100 further includes controlling the frequency of the individually addressing optical beams with an optical modulator or an optical deflector.

In an aspect of the method 1100, the method 1100 further includes performing additional second measurement scans until the frequency shift associated with the single motional mode settles to within a frequency range (e.g., frequency shift changes slow down and the frequency shift does not change much after each scan, a frequency range may identify an amount of change that indicates settling). The method 100 may further include performing the quantum computations in response to the frequency shift associated with the single motional mode settling to within the frequency range.

In an aspect of the method 1100, the method 1100 further includes determining, as part of the second measurement scan, a participation of each of the ions in the ion chain for each of the motional modes.

A quantum computer or QIP system configured to implement the method 1100 may include a trap (e.g., trap 270) configured to hold an ion chain having multiple ions (e.g., chain 110 with ions 106), one or more controllers (e.g., general controller 205, automation and calibration controller 280, and/or optical and trap controller 220), and an algorithms component (e.g., algorithms component 210). The one or more controllers are configured to perform a first measurement scan across all motional modes of an ion chain in a trap to determine frequencies associated with each of the motional modes, perform, subsequent to the first measurement scan, a second measurement scan on a single one of the motional modes to determine a frequency shift associated with the single motional mode and with which to adjust the single motional mode, adjust the frequencies associated the remaining motional modes by applying the frequency shift associated with the single motional mode, and adjust the implementation of two-qubit gates for quantum computations by the algorithms component based on the adjusted frequencies for all the motional modes.

In an aspect of the quantum computer or QIP system, the one or more controllers are configured to perform the first measurement scan is in response to a loading of the ion chain in the trap.

In an aspect of the quantum computer or QIP system, in response to the frequency shift associated with the single motional mode exceeding a specified range, the one or more controllers are configured to perform a third measurement scan across all motional modes using a narrower scanning frequency band about the adjusted frequencies for all motional modes.

In an aspect of the quantum computer or QIP system, the first measurement scan includes multiple measurements each of which includes applying a global addressing optical beam to all the ions in the ion chain and individually addressing optical beams to each of the ions in the ion chain at the same frequency. The one or more controllers are further configured to control the frequency of the individually addressing optical beams with an optical modulator or an optical deflector (e.g., AOMs, EOMs, AODs, or EODs).

In an aspect of the quantum computer or QIP system, the second measurement scan includes a single measurement that includes applying a global addressing optical beam to all the ions in the ion chain and individually addressing optical beams to each of the ions in the ion chain at different frequencies. The one or more controllers are further configured to control the frequency of the individually addressing optical beams with an optical modulator or an optical deflector (e.g., AOMs, EOMs, AODs, or EODs).

In an aspect of the quantum computer or QIP system, the one or more controllers are further configured to perform additional second measurement scans until the frequency shift associated with the single motional mode settles to within a frequency range (e.g., frequency shift changes slow down and the frequency shift does not change much after each scan, a frequency range may identify an amount of change that indicates settling). The algorithms component is configured to perform the quantum computations in response to the frequency shift associated with the single motional mode settling to within the frequency range.

In an aspect of the quantum computer or QIP system, the one or more controllers are further configured to determine, as part of the second measurement scan, a participation of each of the ions in the ion chain for each of the motional modes.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for spectroscopy in trapped-ion quantum computers, comprising:
  performing a first measurement scan across all motional modes of an ion chain in a trap to determine frequencies associated with each of the motional modes;
  performing, subsequent to the first measurement scan, a second measurement scan on a single motional mode of the motional modes to determine a frequency shift associated with the single motional mode and with which to adjust the single motional mode;
  adjusting the frequencies associated with the remaining motional modes by applying the frequency shift associated with the single motional mode; and
  implementing two-qubit gates for quantum computations by calculating one or more two-qubit gate solution parameters using the adjusted frequencies for all the motional modes.

2. The method of claim 1, wherein performing the first measurement scan is in response to a loading of the ion chain in the trap.

3. The method of claim 1, wherein in response to the frequency shift associated with the single motional mode exceeding a specified range, performing a third measurement scan across all motional modes using a narrower scanning frequency band about the adjusted frequencies for all motional modes.

4. The method of claim 1, wherein the first measurement scan includes multiple measurements each of which includes applying a global addressing optical beam to all the ions in the ion chain and individually addressing optical beams to each of the ions in the ion chain at the same frequency.

5. The method of claim 4, further comprising controlling the frequency of the individually addressing optical beams with an optical modulator or an optical deflector.

6. The method of claim 1, wherein the second measurement scan includes a single measurement that includes applying a global addressing optical beam to all the ions in the ion chain and individually addressing optical beams to each of the ions in the ion chain at different frequencies.

7. The method of claim 6, further comprising controlling the frequency of the individually addressing optical beams with an optical modulator or an optical deflector.

8. The method of claim 1, further comprising performing additional second measurement scans until the frequency shift associated with the single motional mode settles to within a frequency range.

9. The method of claim 8, further comprising performing the quantum computations in response to the frequency shift associated with the single motional mode settling to within the frequency range.

10. The method of claim 1, further comprising determining, as part of the second measurement scan, a participation of each of the ions in the ion chain for each of the motional modes.

11. A quantum computer, comprising:
  a trap configured to hold an ion chain having multiple ions; and
  one or more controllers configured to:
    perform a first measurement scan across all motional modes of an ion chain in a trap to determine frequencies associated with each of the motional modes;
    perform, subsequent to the first measurement scan, a second measurement scan on a single motional mode of the motional modes to determine a frequency shift associated with the single motional mode and with which to adjust the single motional mode;
    adjust the frequencies associated with the remaining motional modes by applying the frequency shift associated with the single motional mode; and
    implement two-qubit gates for quantum computations by calculating one or more two-qubit gate solution parameters using the adjusted frequencies for all the motional modes.

12. The quantum computer of claim 11, wherein the one or more controllers are configured to perform the first measurement scan is in response to a loading of the ion chain in the trap.

13. The quantum computer of claim 11, wherein in response to the frequency shift associated with the single motional mode exceeding a specified range, the one or more controllers are configured to perform a third measurement scan across all motional modes using a narrower scanning frequency band about the adjusted frequencies for all motional modes.

14. The quantum computer of claim 11, wherein the first measurement scan includes multiple measurements each of which includes applying a global addressing optical beam to all the ions in the ion chain and individually addressing optical beams to each of the ions in the ion chain at the same frequency.

15. The quantum computer of claim 14, wherein the one or more controllers are further configured to control the frequency of the individually addressing optical beams with an optical modulator or an optical deflector.

16. The quantum computer of claim 11, wherein the second measurement scan includes a single measurement that includes applying a global addressing optical beam to all the ions in the ion chain and individually addressing optical beams to each of the ions in the ion chain at different frequencies.

17. The quantum computer of claim 16, wherein the one or more controllers are further configured to control the frequency of the individually addressing optical beams with an optical modulator or an optical deflector.

18. The quantum computer of claim 11, wherein the one or more controllers are further configured to perform additional second measurement scans until the frequency shift associated with the single motional mode settles to within a frequency range.

19. The quantum computer of claim 18, further comprising a quantum processing unit configured to perform the quantum computations in response to the frequency shift associated with the single motional mode settling to within the frequency range.

20. The quantum computer of claim 11, wherein the one or more controllers are further configured to determine, as part of the second measurement scan, a participation of each of the ions in the ion chain for each of the motional modes.

21. A method for spectroscopy in trapped-ion quantum computers, the method comprising:

performing a first measurement scan across all motional modes of an ion chain in a trap to determine frequencies associated with each of the motional modes;

performing, subsequent to the first measurement scan, a second measurement scan on a single motional mode of the motional modes to determine a frequency shift associated with the single motional mode and with which to adjust the single motional mode;

adjusting the frequencies associated with the remaining motional modes by applying the frequency shift associated with the single motional mode; and implementing two-qubit gates for quantum computations.

\* \* \* \* \*